C. CROWL.
TIRE SUPPORT.
APPLICATION FILED AUG. 14, 1918.
1,286,241.
Patented Dec. 3, 1918.
2 SHEETS—SHEET 1.
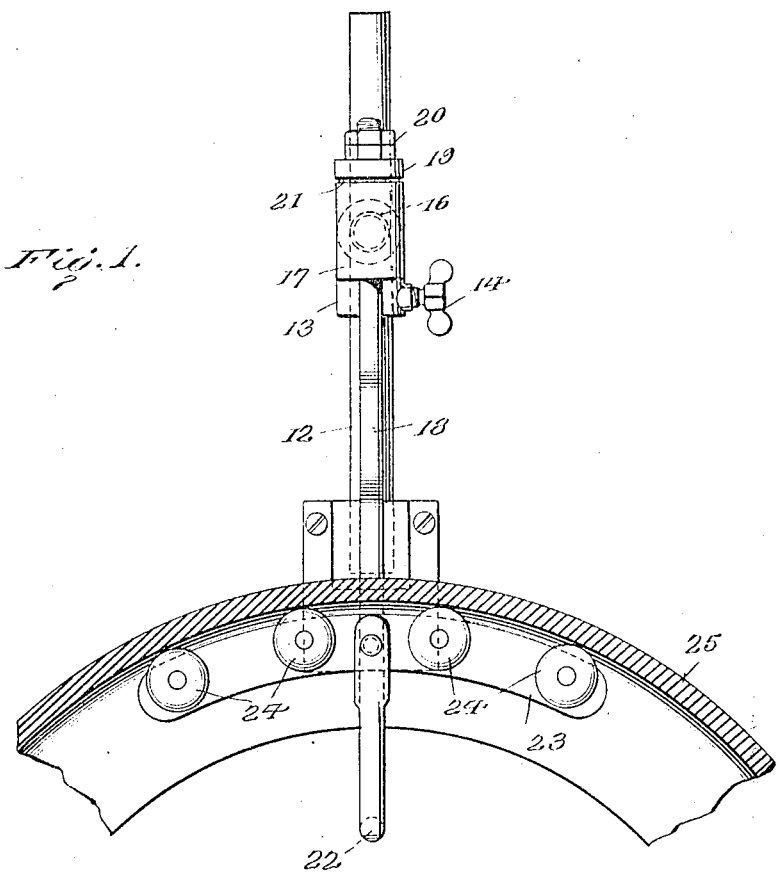
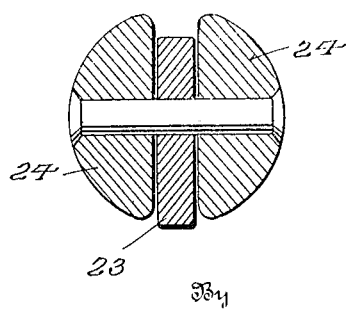

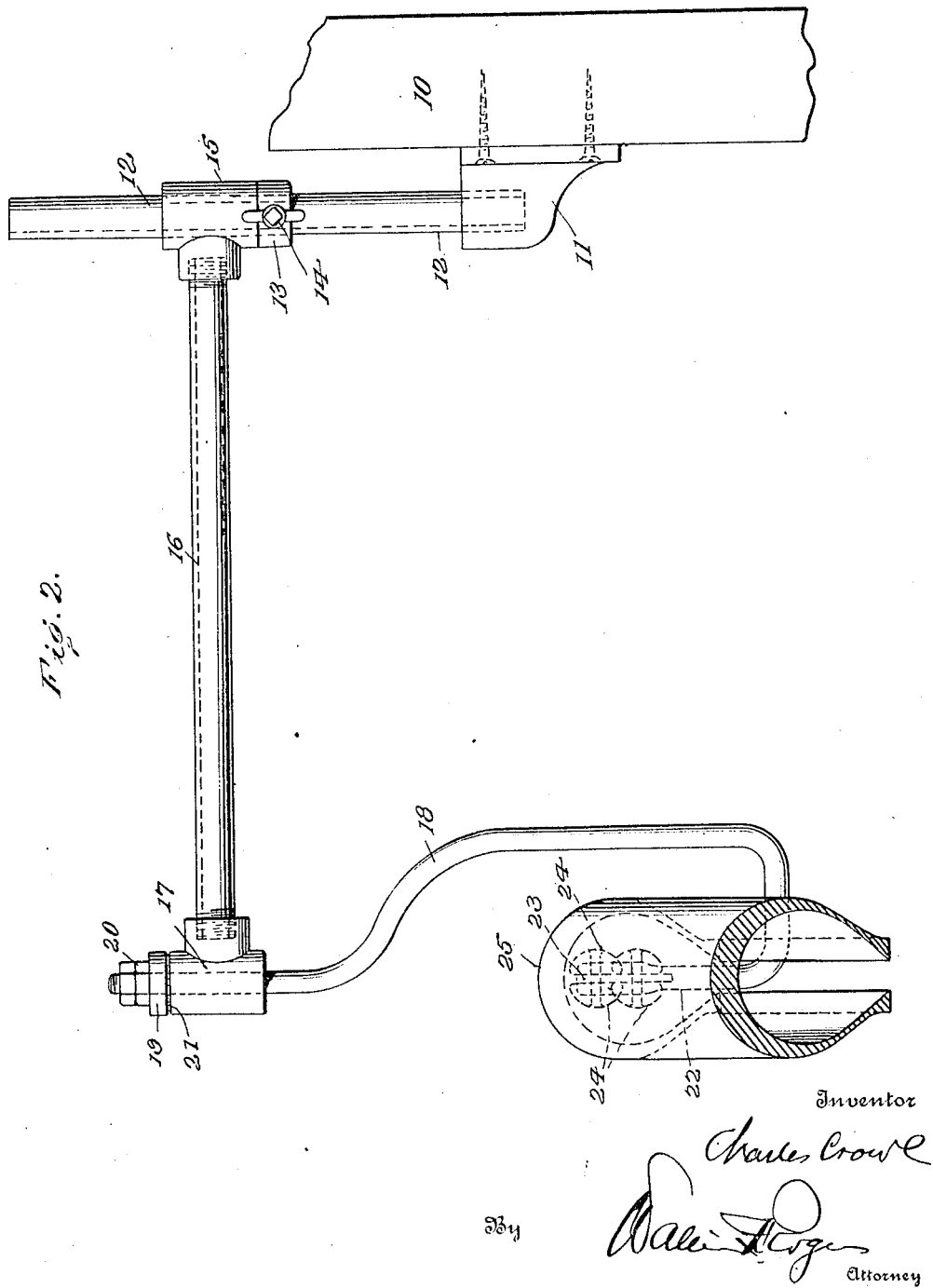

UNITED STATES PATENT OFFICE.

CHARLES CROWL, OF EAST PALESTINE, OHIO, ASSIGNOR TO NATIONAL TIRE & RUBBER COMPANY, OF EAST PALESTINE, OHIO, A CORPORATION OF OHIO.

TIRE-SUPPORT.

1,286,241.

Specification of Letters Patent.

Patented Dec. 3, 1918.

Application filed August 14, 1918. Serial No. 249,879.

*To all whom it may concern:*

Be it known that I, CHARLES CROWL, a citizen of the United States, residing at East Palestine, in the county of Columbiana and State of Ohio, have invented certain new and useful Improvements in Tire-Supports; and I do hereby declare the following to be a full, clear, and exact description of the invention, such as will enable others skilled in the art to which it appertains to make and use the same.

My invention relates to devices for carrying tires, and especially rubber tires, during inspection.

Its object is to provide a device which will permit of the ready application and handling of the tire and especially the casing of a pneumatic tire, so that while all parts of the tire are being examined it may be supported and easily handled.

In the drawings,—

Figure 1 represents substantially a side elevation;

Fig. 2 is a detail, partly in section, of the tire carrying feature;

Fig. 3 a sectional detail showing an arrangement of half-balls which bear the tire and permit it to be readily moved back and forth.

In the drawings, 10 represents a support or wall to which my device is secured through a bracket 11.

In the bracket 11 is rotatably mounted a vertical shaft 12. 13 represents a collar secured to the shaft 12 by a set screw 14.

15 represents a union sleeve free to turn upon the shaft 12 and carrying one end of a horizontal rod or shaft 16 which is seated at the opposite end in a union sleeve 17 which it supports.

18 represents a dependent rod having a collar 19 at the top held in place by a nut and washer 20.

As indicated at 21, anti-friction balls are employed, and it is apparent that the rod 18 is carried upon the top of the sleeve 17 in which the rod 18 may freely rotate.

The rod 18 is bent at the bottom and is turned upon itself to form an upwardly projecting part 22, which is bifurcated to carry a plate or bar 23, secured to the supporting rod 22 and curved in substantial accordance with the customary curvature of a tire-casing. 24 represents half-balls arranged at intervals along the plate 23 and journaled therein in opposing pairs.

In use, the rubber tire, indicated at 25, is fitted over the top of the bifurcated rod 22 and dropped upon the series of half-balls 24, which are arranged so as to conform to the customary curvature of such tires.

The tire thus supported can be moved about to permit a ready inspection of the beads and can be swung laterally to permit the ready inspection of each side of the tire casing; and the whole device may be swung to one side out of the way and against the wall.

I claim:—

1. In a tire support, the combination of a vertical standard, a horizontal arm journaled or pivoted upon the standard, a depending rotatable arm carried by the horizontal arm, a curved plate carried by the rotatable arm.

2. In a tire support, the combination of a rotatable and swinging arm and a plate substantially conforming to the curvature of a tire-casing.

3. In a tire support, a dependent swinging rotatable arm bent upward upon itself, a curved plate carried by the arm, and half-balls journaled in the curved plate.

In testimony whereof I affix my signature.

CHARLES CROWL.

Copies of this patent may be obtained for five cents each, by addressing the "Commissioner of Patents, Washington, D. C."